United States Patent Office 3,253,061
Patented May 24, 1966

3,253,061
THIONOPHOSPHONIC ACID ESTERS AND PROCESSES FOR THEIR PRODUCTION
Hanshelmut Schlör, Wuppertal-Barmen, Ernst Schegk, Wuppertal-Elberfeld, and Gerhard Schrader, Wuppertal-Cronenberg, Germany, assignors to Farbenfabriken Bayer Aktiengesellschaft, Leverkusen, Germany, a corporation of Germany
No Drawing. Filed Dec. 29, 1959, Ser. No. 862,503
Claims priority, application Germany, Jan. 7, 1959, F 27,421
16 Claims. (Cl. 260—954)

The present invention relates to and has as its objects new and useful insecticidal compounds as well as processes for the production thereof. Generally the new compounds are thionophosphonic acid-O-alkyl-O-aryl-esters of the general formula

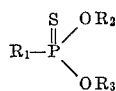

wherein $R_1$ and $R_2$ stand for alkyl residues and $R_3$ stands for aryl radicals.

Thionophosphoric acid esters similar to those of the above shown formula are known to be effective pesticides which are used commercially in the field of protecting plans against damage of insects, mites and the like.

In accordance with the present invention it has now been found that compounds of the above shown formula, more specifically such compounds of the following formula

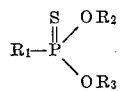

in which $R_1$ stands for lower alkyl or halo-substituted lower alkyl radicals, $R_2$ stands for lower alkyl radicals and $R_3$ stands for an aryl radical substituted by nitro and/or halogen and/or lower alkyl groups, possess outstanding insecticidal activities which make those compounds very effective substances for combating plant pests.

The compounds of this invention may be prepared by methods known in principal, e.g. by reacting corresponding thionophosphonic ester halides with chlorinated or nitrated phenols. The reaction may be shown by the following scheme:

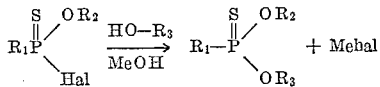

The alkyl-thionophosphonic acid-O-alkyl-O-aryl esters which are not yet known are distinguished in addition to their relatively small toxicity against warm-blooded animals by their marked insecticidal properties. Some of the compounds according to this invention show on large animals, such as cattle or sheep a distinct systemic activity resulting in killing ectoparasites when the aforesaid substances are administered per os. To this effect the compounds according to this invention are expediently given to the animals in the form of tablets or aqueous suspensions admixed with the feed.

It is also possible to apply the compounds obtainable according to the invention to the skin by brushing. Absorption of the compounds by the skin also ensures a protection of large cattle especially against infestation by the gadfly. The combination used for this purpose is similar to that used in general for plant protection, i.e., an aqueous emulsion with a solubilizing agent and preferably a non-ionic emulsifier is especially suitable.

Moreover, the compounds of the present invention may also be used as plant protectants and for combating detrimental insects in agriculture.

The new compounds of the present invention very effectively kill insects like flies, mites, aphids etc. They distinguish themselves especially by a good contact-insecticidal activity and at the same time by an activity on eating insects such as caterpillars. They may be used in the same manner as other known phosphoric acid insecticides, i.e. in a concentration from about 0.00001% to about 1%, diluted or extended with suitable solid or liquid carriers or diluents. Examples of such solid carriers are talc, chalk, bentonite, clay and the like, as liquid carriers there may be mentioned, water (if necessary with commercial emulsifiers), alcohols, especially lower alcohols such as methanol or ethanol, ketones, especially lower ketones such as acetone or methyl ethyl ketone, liquid hydrocarbons and the like. The new compounds may furthermore be used in combination with each other or with known insecticides, fertilizers etc.

As examples, for the special utility of the inventive compounds the compounds of the following formulae (I) 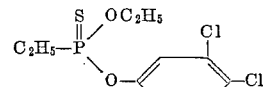

(II) 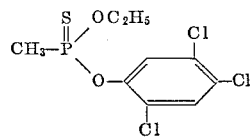

have been tested against blow flies and spider mites respectively.

Aqueous solutions of the aforementioned compounds have been prepared by admixing them with the same amount of an auxiliary solvent (acetone). A commercial emulsifier (benzyl hydroxy diphenyl polyglycol ether) is added in an amount of 20% referred to active ingredient. This premixture then is diluted with water to the desired concentrations. The tests have been carried out in the following manner:

(a) Against blow flies: about 50 flies were placed under covered petri dishes in which drip wet filter paper had been placed which was sprayed with 0.0001% solutions of Compound I. The living status of the flies has been determined after 24 hours. 100% killing was obtained.

(b) Against spider mites (contact-insecticidal action): bean plants (*Phaseolus vulgaris*) of about 15 inches height were sprayed drip wet with 0.001% solutions of Compound II. The bean plants have been infested heavily with the two-spotted spider (species *Tetranychus telarius*). Evaluation has been carried out after 24 hours, 48 hours and 8 days. 100% killing was obtained after 8 days.

The following examples are given for the purpose of illustrating the present invention:

*Example 1*

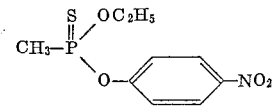

40 grams (0.25 mol) of p-nitrophenol-sodium salt are dissolved in 150 cc. of methyl ethyl ketone. 40 grams of methyl-thionophosphonic acid O-ethyl ester chloride (B.P. 60°/12 mm. Hg) are added thereto with stirring. The mixture is afterstirred for an hour, and the reaction product is then run into 400 cc. of water. The precipitated oil is taken up in benzene. The benzene layer is separated and dried over sodium sulfate. Upon fractionation there are obtained 40 grams of the ester of B.P. 108° C./0.01 mm. Hg. Yield 62% of the theoretical.

On rats per os the ester shows a toxicity of 2.5 mg./kg., $LD_{50}$. Spider mites are killed to 100% even at a concentration of 0.001%.

By the same way, but using instead of the p-nitrophenol sodium salt the corresponding equimolecular amount of the 3-methyl-4-nitrophenol sodium salt there is obtained the following compound (toxicity on rats per os $LD_{50}$ 2.5 mg./kg.)

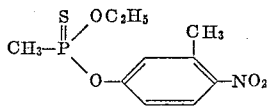

With the 3.5-dimethyl-4-nitrophenol sodium salt there is obtained the following compound

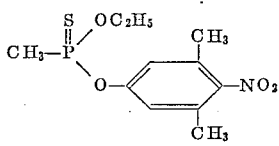

With the 3-chloro-4-nitrophenol salt there is obtained the following compound

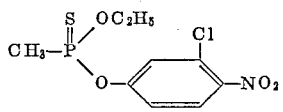

*Example 2*

$$\text{C}_2\text{H}_5-\underset{\underset{\text{S}}{\|}}{\text{P}}\underset{\text{O}-\text{C}_6\text{H}_4-\text{NO}_2}{\overset{\text{OC}_2\text{H}_5}{\diagup}}$$

40 grams (0.25 mol) of p-nitrophenol sodium salt are dissolved in 150 cc. of methyl ethyl ketone. 44 grams of ethyl-thionophosphonic acid-O-ethyl ester chloride (B.P. 48° C./1 mm. Hg) are added thereto at 35° C. with stirring. The mixture is stirred for another hour at 40° C. and then worked up as described in Example 1. 41 grams of the new ester of 122° C./0.01 mm. Hg are obtained. Yield 60% of the theoretical.

On rats per os the new ester shows a toxicity of 5 mg./kg., $LD_{50}$. Aphids are killed with certainty even at a concentration of 0.001%.

By the same way, but using instead of the p-nitrophenol sodium salt the same amount of 2-chloro-4-nitrophenol sodium salt there is obtained the following compound

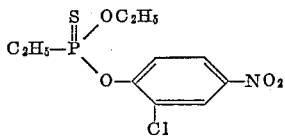

*Example 3*

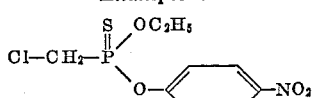

40 grams (0.25 mol) of p-nitrophenol sodium salt are dissolved in 150 cc. of methyl ethyl ketone. 49 grams of α-chloromethyl-thionophosphonic acid-O-ethyl ester chloride (B.P. 61° C./1 mm. Hg) are added thereto at 40° C. with stirring. The mixture is warmed to 40° C. for another hour and then worked up as described in Example 1. 44 grams of the ester are obtained as a pale yellow viscous oil. The ester is distillable only with decomposition even in a high vacuum.

Toxicity on rats per os 50 mg./kg., $LD_{50}$. Aphids are killed to 100% with 0.01% solutions, caterpillars to 100% with 0.1% solutions.

*Example 4*

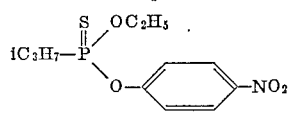

To 33 grams (0.2 mol) of p-nitrophenol sodium salt in 120 cc. of methyl ethyl ketone are added dropwise at 10° C. 37 grams (0.2 mol) of isopropyl-thionophosphonic acid-O-ethyl ester chloride (B.P. 80–81° C./12 mm. Hg). The mixture is warmed to 40° C. and kept at this temperature for another 2 hours. 22 grams of the new ester are obtained. Re-crystallized from a little petroleum ether the ester shows a melting point of 44–46° C. Yield 38% of the theoretical.

Toxicity on rats per os $LD_{50}$ 50 mg./kg. Aphids are killed completely with 0.01% solutions. Caterpillars are also killed to 100% at 0.1% concentrations.

By the same way, but using instead of the p-nitrophenol sodium salt the corresponding equimolecular amount of 3-nitro-4-chlorophenol sodium salt there is obtained the following compound

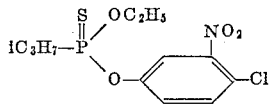

*Example 5*

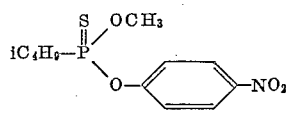

To 33 grams (0.2 mol) of p-nitrophenol sodium salt in 120 cc. of methyl ethyl ketone are added dropwise at 20–30° C. 37 grams (0.2 mol) of isobutyl-thionophosphonic acid-O-methyl-ester chloride (B.P. 82–85° C./11 mm. Hg). The mixture is kept at 50–60° C. for another 2 hours and then worked up in usual manner. 32 grams of the new ester of M.P. 39–41° C. are obtained. Yield 55% of the theoretical.

Toxicity on rats per os $LD_{50}$ 250 mg./kg. Caterpillars are killed to 100% with 0.1% solutions.

*Example 6*

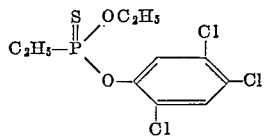

55 grams (0.25 mol) of 2.4.5-trichlorophenol sodium salt are dissolved in 250 cc. of methyl ethyl ketone. The mixture is cooled to +20° C. and 52 grams (0.3 mol) of ethyl-thionophosphonic-acid-O-ethyl ester chloride are added thereto with stirring. The reaction product is kept at 50° C. for another 2 hours and then worked up in usual manner. 67 grams of the new ester are obtained as a non-distillable oil. Yield 80% of the theoretical.

Toxicity on rats per os $LD_{50}$ 50 mg./kg. Blow flies are killed to 100% even at 0.0001% concentrations.

*Example 7*

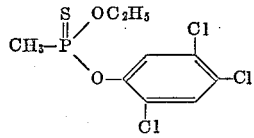

44 grams (0.2 mol) of 2.4.5-trichlorophenol sodium salt are dissolved in 200 cc. of ethyl methyl ketone. 34 grams of methyl-thionophosphonic acid-O-ethyl ester chloride are added thereto at 50° C. with stirring. The temperature is kept for an hour and the mixture is then worked up in usual manner. 32 grams of the ester of B.P. 95° C./0.01 mm. Hg are obtained. Yield 50% of the theoretical.

Toxicity on rats per os $LD_{50}$ 25 mg./kg. Aphids and spider mites are killed to 100% with 0.001% solutions. The preparation has a marked ovicidal activity on the eggs of the red spider even at 0.01% concentrations.

*Example 8*

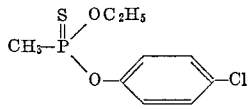

6 grams of powdered sodium are suspended in 100 cc. of benzene. A solution of 33 grams (0.25 mol) of p-chlorophenol in 50 cc. of benzene are added thereto. The mixture is stirred at 50° C. for an hour and 40 grams of methyl-thionophosphonic acid ethyl ester chloride are then added thereto at 55° C. with further stirring. Stirring is continued at the indicated temperature for 6 hours and 300 cc. of benzene are added to the reaction product. The benzene solution is shaken several times with water and subsequently dried over sodium sulfate. Upon fractionation there are obtained 44 grams of the new ester as a water-insoluble colorless oil of B.P. 94° C./0.01 mm. Hg.

On rats per os the new ester shows a toxicity of 10 mg./kg., $LD_{50}$.

If instead of the p-chloro-phenol the corresponding equimolecular amount of the 4-chloro-3-nitrophenol is used there is obtained the compound of the following formula

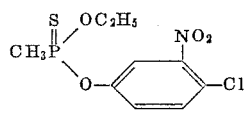

*Example 9*

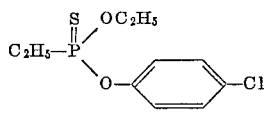

6 grams of powdered sodium are suspended in 100 cc. of benzene. A solution of 33 grams (0.25 mol) of p-chlorophenol in 50 cc. of benzene are added thereto with stirring. Stirring is continued at 50° C. for an hour and 44 grams of ethyl-thionophosphonic acid-ethyl ester chloride (B.P. 48° C./1 mm. Hg) are subsequently added thereto at 60° C. Upon usual working up there are obtained 46 grams of the new ester as a water-insoluble colorless oil of B.P. 102° C./0.01 mm. Hg. Yield 69% of the theoretical.

On rats per os the ester shows a toxicity of 50 mg./kg., $LD_{50}$.

*Example 10*

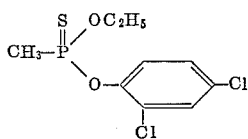

6 grams of powdered sodium are suspended in 100 cc. of benzene. A solution of 42 grams of 2.4-dichlorophenol (0.25 mol) in 50 cc. of benzene are added thereto with stirring. The mixture is after-stirred at 50° C. for an hour and 50 cc. of methyl ethyl ketone are added. 40 grams of methyl-thionophosphonic acid ethyl ester chloride are then added dropwise at 50° C. and the mixture is warmed to 60° C. for 6 hours. Upon usual working up there are obtained 48 grams of a water-insoluble pale yellow oil. Yield 67% of the theoretical.

On rats per os the new ester shows a toxicity of 10 mg./kg., $LD_{50}$.

*Example 11*

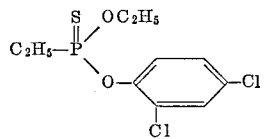

6 grams of powdered sodium are suspended in 100 cc. of benzene. A solution of 42 grams (0.25 mol) of 2.4-dichlorophenol in 50 cc. of benzene is added thereto with stirring. The reaction product is warmed to 50° C. for an hour and 50 cc. of methyl ethyl ketone are added then. 44 grams of ethyl-thionophosphonic acid ethyl ester chloride are added dropwise at 50° C. The product is stirred at 50° C. for 6 hours and then worked up in usual manner. 52 grams of the ester are obtained as a water-insoluble pale yellow oil. Yield: 70% of the theoretical.

On rats per os the new ester shows a toxicity of $LD_{50}$ 50 mg./kg.

*Example 12*

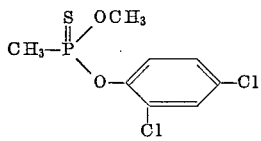

7 grams of powdered sodium are suspended in 100 cc. of benzene. A solution of 49 grams (0.3 mol) of 2.4-dichlorophenol in 50 cc. of benzene is added thereto. 49 grams of methyl-thionophosphonic acid methyl ester chloride are added dropwise at 50° C. The product is kept at 60° C. for another 7 hours and then worked up in usual manner. 73 grams of the new ester are obtained as a water-insoluble colorless oil of B.P. 101° C./0.01 mm. Hg. Yield: 81% of the theoretical. $D_4^{20}=1.252$; $n_D^{20}=1.5662$.

On rats per os the new ester shows a toxicity of $LD_{50}$ 500 mg./kg.

*Example 13*

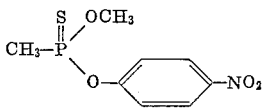

69 grams of p-nitrophenol (0.5 mol) are dissolved in 200 ml. of methyl ethyl ketone. To this solution there are added 75 grams of finely powdered potassium carbonate and a catalytical amount of copper powder. At 80° C. there are added while stirring 73 grams of methyl-thionophosphonic acid-O-methyl ester chloride. Stirring is continued for 2 hours at 80° C. and the salt which precipitates is filtered with suction. The filtrate is taken up in 400 ml. of benzene and subsequently washed neutrally with water. The benzenic solution is dried over anhydrous sodium sulfate and the solvent is distilled off in vacuum. The residue is distilled under reduced pressure and there are obtained 28 grams of methyl-thionophosphonic acid-O-methyl-O-p-nitrophenol ester distilling at 0.01 mm. Hg at 102° C.

*Example 14*

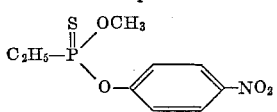

40 grams (0.25 mol) of p-nitrophenol sodium salt are dissolved in 150 ml. of methyl ethyl ketone. At 40° C. there are added while stirring 40 grams of O-methyl-ethyl-thionophosphonic acid chloride. Stirring is continued at 40° C. for 1 further hour whereupon the reaction product is poured into 300 ml. of ice water. The oil which precipitates is taken up in 400 ml. of benzene and the benzenic layer is washed neutrally with the 3% bicarbonate solution. After drying off the benzenic layer the solvent is distilled off in vacuum. There remain 42 grams of ethyl-thionophosphonic acid-O-methyl-O-p-nitrophenol ester as slightly yellowish water-insoluble oil.

*Analysis.*—Calculated mol 261: N, 5.37%; S, 12.3 and P, 11.9%. Found: N, 5.6%; S, 12.0%; P, 10.7%.

*Example 15*

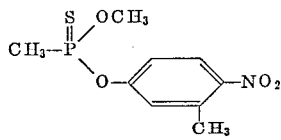

30.5 grams of 4-nitro-3-methylphenol (0.2 mol) (M.P. 130° C.) and 56 grams of powdered potassium carbonate (0.4 mol) are suspended in 200 ml. of methyl ethyl ketone while stirring for 30 minutes at 60 to 70° C. Thereafter are added dropwise at said temperature 29 grams of methyl-thionophosphonic acid-O-methylester chloride. The reaction is completed by further stirring for 2 hours at the above said temperature. The reaction mixture then is cooled and freed from salts by filtration with suction. The salts are washed with 250 ml. of benzene. The organic layer is washed neutrally with water until the washwater is colorless. After drying of the benzenic layer and after distilling off the solvent there are obtained 26 grams of the above ester as a slightly brownish colored oil. Yield 50% of the theoretical. $LD_{50}$ 5 mg./kg. on rats per os.

We claim:

1. A compound of the formula

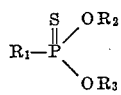

wherein $R_1$ is lower alkyl, $R_2$ is lower alkyl and $R_3$ is selected from the group consisting of halophenyl and nitro-lower alkylphenyl.

2. A compound of the formula

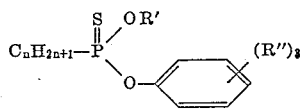

wherein R' is alkyl having up to 4 carbon atoms, R'' is chlorine, and $n$ is an integer from 1 to 4.

3. A compound of claim 1 wherein $R_3$ is nitro-lower alkyl-phenyl.

4. The thionophosphonic acid ester of the following formula

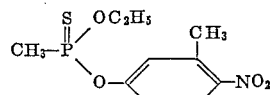

5. The thionophosphonic acid ester of the following formula

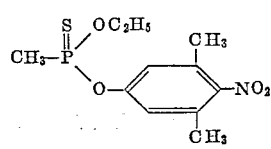

6. The thionophosphonic acid ester of the following formula

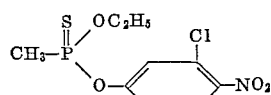

7. The thionophosphonic acid ester of the following formula

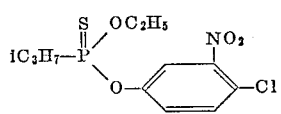

8. The thionophosphonic acid ester of the following formula

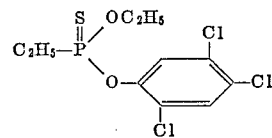

9. The thionophosphonic acid ester of the following formula

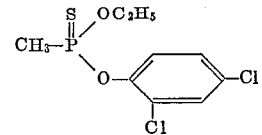

10. The thionophosphonic acid ester of the following formula

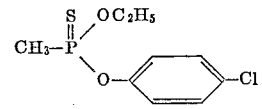

11. The thionophosphonic acid ester of the following formula

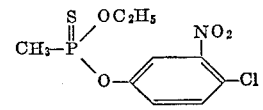

12. The thionophosphonic acid ester of the following formula

13. The thionophosphonic acid ester of the following formula

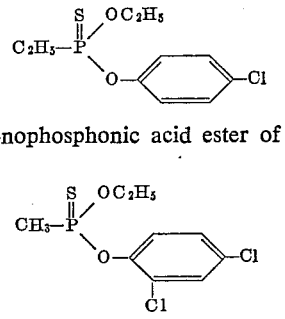

14. The thionophosphonic acid ester of the following formula

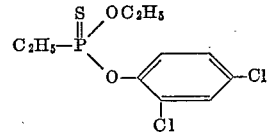

15. The thionophosphonic acid ester of the following formula

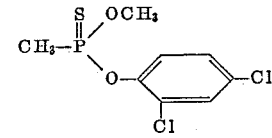

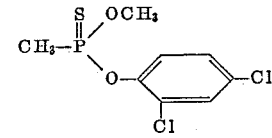

16. The thionophosphonic acid ester of the following formula

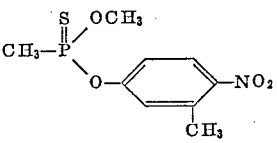

(References on following page)

References Cited by the Examiner

UNITED STATES PATENTS

| | | | |
|---|---|---|---|
| 2,664,437 | 12/1953 | Fletcher | 260—461 |
| 2,667,438 | 1/1954 | Gardner | 167—53.2 |
| 2,668,841 | 2/1954 | Tolkmith | 260—461 |
| 2,668,843 | 2/1954 | Tolkmith | 260—461.310 |
| 2,910,402 | 10/1959 | Fairchild | 260—461.110 |
| 2,952,584 | 9/1960 | Whitmire et al. | 167—53.2 |
| 3,032,580 | 5/1962 | Schrader | 260—461 |
| 3,096,238 | 7/1963 | Baker et al. | 260—461.110 |
| 3,149,143 | 9/1964 | Newallis et al. | 260—461 |

FOREIGN PATENTS 814,152    9/1951    Germany.

OTHER REFERENCES

Kabachnik et al.: Zhur. Obschii Chem. 28 (6), 1568–73 (1958).

Razumov et al.: Chem. Abs. 52, 237–238 (1958).

Schrader: "Angew. Chem.," vol. 66, pp. 265–267 (1953).

CHARLES B. PARKER, *Primary Examiner.*

A. H. WINKELSTEIN, JOSEPH R. LIBERMAN,
*Examiners.*